MAGNETIC RECORD DEVICE AND METHOD OF PREPARING IT

Filed Jan. 5, 1959 2 Sheets-Sheet 1

INVENTORS H. B. ANDREW
C. C. HIPKINS
L. M. TOWSLEY
BY George S. Indig
ATTORNEY

Jan. 9, 1962 H. B. ANDREW ET AL 3,016,310

MAGNETIC RECORD DEVICE AND METHOD OF PREPARING IT

Filed Jan. 5, 1959 2 Sheets-Sheet 2

INVENTORS H. B. ANDREW
C. C. HIPKINS
L. M. TOWSLEY

BY George S. Indig

ATTORNEY

United States Patent Office 3,016,310

Patented Jan. 9, 1962

3,016,310

MAGNETIC RECORD DEVICE AND METHOD OF PREPARING IT

Harold B. Andrew and Clement C. Hipkins, Chatham, and Le Roy M. Towsley, Summit, N.J., assignors to Bell Telephone Laboratories, Incorporated, New York, N.Y., a corporation of New York Filed Jan. 5, 1959, Ser. No. 785,091

5 Claims. (Cl. 117—104)

Figure 1:
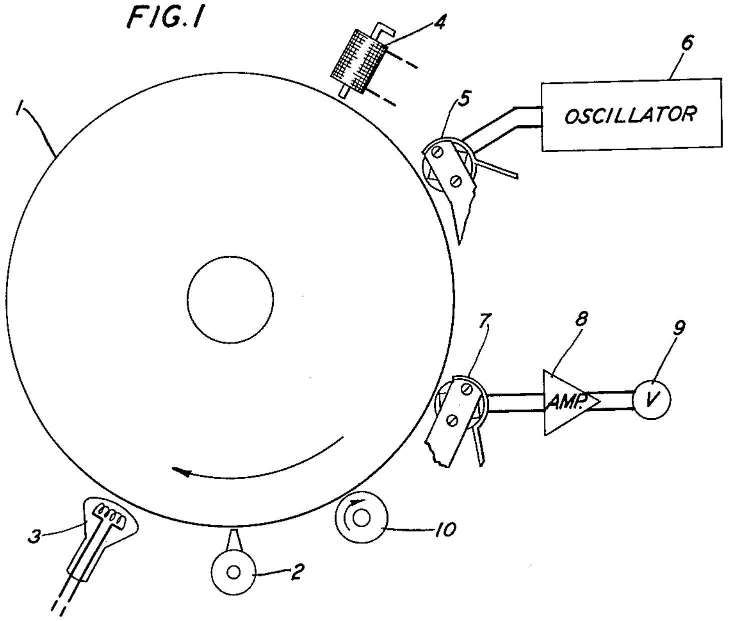

This invention relates to the formation of magnetic surfaces on drums, tapes, discs and the like and to products so formed.

Increasing use of complex memory circuits has focused attention on recording media and devices associated therewith. The more common recording media contain a ferromagnetic oxide dispersed in an organic medium. For example, United States Patent 2,694,656 to Marvin Camras describes a recording medium comprising fine, acicular crystalline ferric oxide dispersed in cellulose acetate, the solids content being 38.6 percent. As in all recording media, this composition has an inherent noise level which becomes increasingly important as the signal level to be recorded decreases. This characteristic is frequently expressed as the signal-to-noise ratio. It is obviously desirable to have as large a signal-to-noise ratio as possible.

Prior attempts to improve the signal-to-noise ratio have centered on compositional changes. The method for applying such compositions to the desired surface has not varied significantly, however. Briefly, this standardized method comprises applying the compositions to the desired surface until the desired coating thickness is obtained, for example by spraying, dipping and the like, drying the coating, and then buffing it to obtain a smooth surface.

In accordance with the present invention, magnetic surfaces of improved signal-to-noise characteristics can be obtained using conventional compositions. More particularly, in accordance with the methods of this invention, a magnetic recording surface is applied to a drum, tape, disc or the like by spraying onto the surface successive thin layers of the magnetic composition, each layer being dried before the next layer is applied. It may be desirable in obtaining a smooth surface to buff each layer before application of the next layer or to buff after application of all the layers. This sequence of steps is repeated a number of times until the desired signal level is obtained. Practical considerations dictate an individual dried layer thickness of approximately 0.002 mil to 0.004 mil. For thicknesses much greater than 0.004 mil the advantages of the thin layer laminations of this invention are lost. The minimum thickness is limited by the particle size of the magnetic oxide used. In general, a total coating thickness of approximately one mil to two mils is suitable. An advantage inherent in this process is the extremely precise reproducibility obtainable of magnetic surfaces having the same signal level. Such reproducibility is limited only by the signal level monitoring equipment used. By use of the apparatus described herein, a reproducibility of 0.2 decibel is consistently obtained. Reproducibility of coatings produced by prior art procedures is generally of the order of plus or minus one decibel or greater. Accordingly, the process is singularly adapted to reproduce multiple magnetic channels on drums, tapes, discs and the like.

Figure 2:
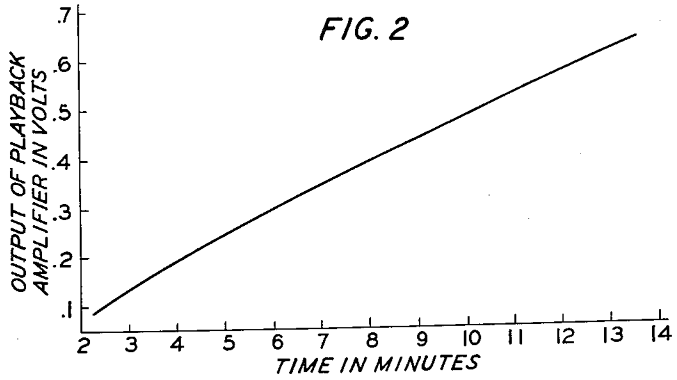
Figure 3:
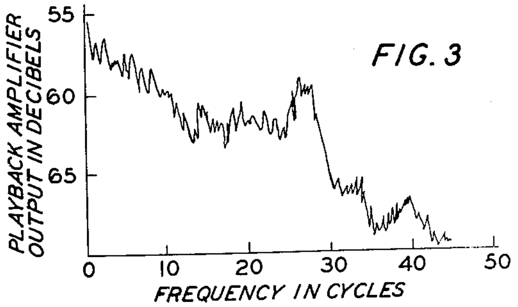
Figure 4:
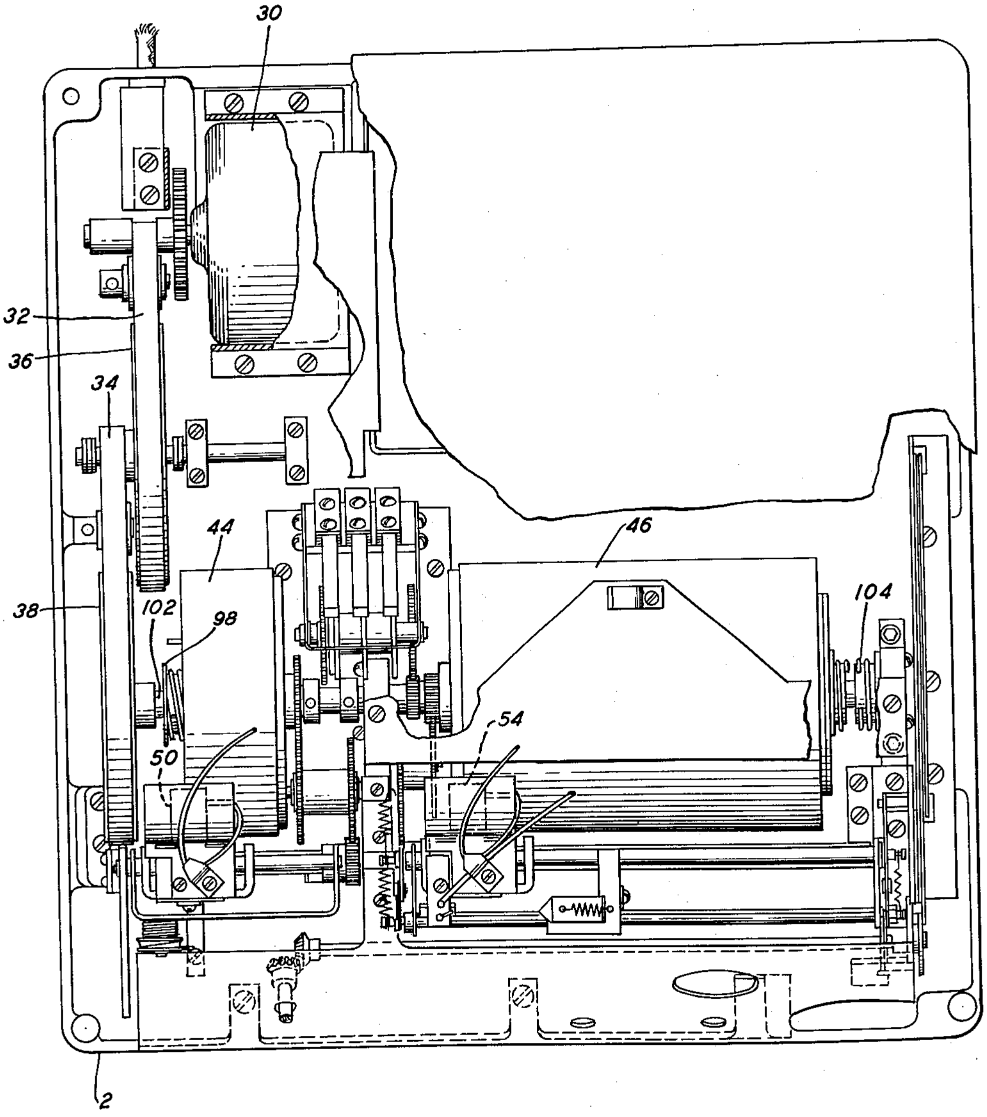

A more complete understanding of the features of this invention together with additional objects thereof may be gained from the reading of the following description in conjunction with the accompanying drawings, in which:

FIG. 1 is a front elevational view of apparatus suitable for use in practicing this invention;

FIG. 2 on coordinates of playback amplifier output in volts versus spray time in minutes is a plot of the relationship of transmission level to coating thickness;

FIG. 3 on coordinates of playback amplifier noise output versus frequency is a plot of noise measurements versus frequency for a magnetic surface formed by methods of this invention; and FIG. 4 is a diagrammatic plan view of a switching and memory device utilizing a magnetic surface formed by methods of this invention.

Referring again to FIG. 1, there is provided a twelve-inch aluminum drum 1 and means (not shown) for rotating it at a uniform speed. Arranged circumferentially around the drum in the order named in the direction of rotation are a spray gun 2; infrared drying lamp 3; erase magnet 4; signal recording means comprising a head 5 for example a type 320LI boundary displacement recording head made by Engineering Research Associates of St. Paul, Minnesota, and an oscillator 6 introducing a signal to head 5 of for example a frequency of fifty cycles at a current of eight milliamperes root mean square; signal reading means comprising playback head 7, playback amplifier 8 and voltmeter 9 for measuring the playback level; and a cotton buffing wheel 10 rotated in the counter direction of drum 1 by means not shown.

Drum 1 is rotated at a constant speed of, for example, forty-five revolutions per minute producing a surface velocity of thirty inches per second. A magnetic dispersion is applied by means of spray gun 2 which can be, for example, a DeVilbiss touch-up gun. Coating thickness is monitored by recording head 5, playback head 7 and the associated equipment to determine the recording level of the applied coating. When the desired recording level is obtained spraying is stopped. As will be discussed further in conjunction with FIG. 2, the level or transmission characteristic is directly proportional to the thickness of the applied magnetic coating. Erase magnet 4 prevents a build-up of impressed signals which would give an erroneous transmission characteristic for a given coating thickness.

Before the aluminum drum is coated, its surface is preferably cleaned to remove grease and other impurities using cleaning techniques well known in the art. Additionally, to insure adequate adhesion of the magnetic coating to the drum, it may, in some instances, be advantageous to pretreat the surface to be coated. For example, it is known to those skilled in the art that etching, anodizing or applying a primer to a metal surface which has been degreased enhances adhesion.

The effect of magnetic coating thickness on the transmission level is shown graphically in FIG. 2. This plot shows that the transmission level is directly proportional to the coating thickness. To obtain this plot use was made of the apparatus described in conjunction with FIG. 1. The spray gun was held approximately five inches from the drum and the spray rate was adjusted to give a dried film approximately two-millionths of an inch thick on a drum which was revolved at a surface speed of thirty inches per second. The drum was first degreased by using a lacquer thinner having the following composition expressed by percent volume: ethyl acetate 5 percent; methyl ethyl ketone 5 percent; butyl acetate 5 percent; methyl isobutyl ketone 5 percent; isopropyl alcohol 10 percent; butanol 2 percent; Cellosolve acetate 2 percent; benzosol 30 percent; and toluol 36 percent. After degreasing, the aluminum drum was coated with a 0.3 mil layer of a primer having the following composition expressed in pounds per hundred gallons of mixed material.

Ingredients of resin component:

| | |
|---|---|
| Polyvinyl-butyral resin | 56 |
| Zinc chromate | 54 |
| Magnesium-silicate | 8 |
| Lampblack | 0.6 |

| | |
|---|---|
| Butyl alcohol | 125 |
| Ethyl alcohol | 380 |
| Ingredients of acid component: | |
| Phosphoric acid | 28 |
| Water | 25 |
| Ethyl alcohol | 102 |

The magnetic material used had the following composition: one part by weight of magnetic dispersion RD-3010 produced by Minnesota Mining and Manufacturing Co. of St. Paul and described in previously mentioned United States Patent 2,694,656 and four parts by weight of a thinner comprising by weight 50 percent butyl acetate, 25 percent toluol and 25 percent naphtha such as "Hi-flash" coal tar naphtha produced by the Neville Co. of Pittsburgh, Pennsylvania, under the designation 2–50–W. It is to be noted that other magnetic dispersions well known to those skilled in the art can be used to practice the teachings of this invention.

FIG. 3 shows graphically the magnetic medium noise associated with magnetic coatings formed by the method described in conjunction with FIG. 1. These measurements were made by substituting a frequency analyzer and level recorder for the voltmeter of FIG. 1. A recording current of five decibels below full load (eight milliamperes) was used to impress a signal on the magnetic surface which was measured. Using this value as a reference point, the signal was turned off and noise measurements with a two-cycle filter made. Fig. 3 shows these measurements over an extended frequency range. It is apparent that the methods of this invention result in a magnetic surface exhibiting a good signal-to-noise characteristic over extended frequency ranges. For example, a typical signal-to-noise ratio at twenty cycles is fifty-eight decibels.

FIG. 4 depicts an embodiment of a sound recording and reproducing apparatus for use in telephone systems containing recording drums 44 and 46 having a magnetic surface prepared by methods of this invention. This device, the operation of which is described in United States Patent 2,761,899 to C. W. Keith and C. A. Nickerson, is adapted to be connected to a subscriber's telephone line for the purpose of automatically transmitting and receiving messages during the absence of the subscriber. Briefly, the general features of this device include the utilization of magnetic recording for both the talk-out and talk-in messages. These messages are recorded on individual talk-out and talk-in drums 44 and 46 mounted on the same shaft but not connected directly to it. Each drum is provided with an electromagnetic transducer 50 and 54 which is traversed axially along the surface of the record medium by means of a half nut which engages a lead screw causing a helical track to be laid down on the medium. In order to insure that the track will be retraced, the lead screw is driven by the drum through constantly meshed gears which guarantee the maintenance of the orientation of the drum with respect to the lead screw. The shaft 102 for the drum is driven by a motor 30 by means of a double set of pulleys 36 and 38 through two belts 32 and 34, preferably made of fabric. The two drums are assembled on this shaft on bearings contained in the drum and each drum is driven from the shaft by means of a constant torque clutch 98 and 104 the collar of which is fixedly attached to the rotating shaft and the plate of which comprises a compliant member which is in constant frictional engagement with the drum. The combination of the driving belts and the compliant clutch member constitutes a compliant system which minimizes any flutter which may be present in the drums. This arrangement also permits the driving of either drum separately and is utilized to hold the talk-in drum stationary during both the record and reproduced talk-out cycles and to hold the talk-out drum stationary during both the record and reproduced talk-in cycles. Rotation of the drums is prevented by means of a pall which falls into a notch in the drum.

The invention has of necessity been described in terms of specific embodiments. The process is generally useful, however, in the formation of magnetic surfaces in all magnetic and storage devices. As such, the process is not limited to the disclosed specific embodiments.

What is claimed is:

1. A method of forming a magnetic recording surface of a single magnetic composition of ferromagnetic particles dispersed in a resin on a solid base which comprises applying to said base a 0.002 mil to 0.004 mil thick coating of a dispersion of ferromagnetic particles in a resin and a solvent for said resin, drying the coating and then repeating this sequence of steps until a desired coating thickness between one mil and two mils is obtained.

2. The process in accordance with claim 1 wherein the said ferromagnetic particles comprise acicular ferric oxide.

3. A method of forming a magnetic coating of a single magnetic composition of ferromagnetic particles dispersed in a resin on a surface which comprises continuously applying to said surface 0.002 mil to 0.004 mil thick coatings of a dispersion of ferromagnetic particles in a resin and a solvent for said resin, continuously drying said coating so as to volatilize said solvent such that as successive coating layers are applied the underlying coating layer is substantially free of said solvent, continuously monitoring by recording a signal of constant amplitude on the resulting cumulative coating, and measuring the amplitude of the signal so recorded, continuing said procedure until said recorded signal attains the desired amplitude and a total coating thickness between one mil and two mils is obtained.

4. The process in accordance with claim 3 wherein each successive coating is mechanically buffed subsequent to volatilization of said solvent and prior to application of each succeeding layer.

5. A magnetic recording surface one mil to two mils thick comprising 250 to 1000 layers of a single magnetic composition of a dispersion of ferromagnetic particles in a resin, each layer being 0.002 mil to 0.004 mil thick.

References Cited in the file of this patent

UNITED STATES PATENTS

| | | |
|---|---|---|
| 2,199,526 | McCowen | May 7, 1940 |
| 2,633,431 | De Sylva | Mar. 31, 1953 |
| 2,643,130 | Kornei | June 23, 1953 |
| 2,647,954 | Howell | Aug. 4, 1953 |
| 2,654,681 | Lueck | Oct. 6, 1953 |

OTHER REFERENCES

Haynes: Elements of Magnetic Recording, page 78, Prentice-Hall, N.J., 1957.